US008818999B2

(12) United States Patent
Edala et al.

(10) Patent No.: US 8,818,999 B2
(45) Date of Patent: Aug. 26, 2014

(54) FUZZY PROXIMITY BOOSTING AND INFLUENCE KERNELS

(75) Inventors: Narasimha Edala, New Albany, OH (US); Donald Loritz, Springboro, OH (US)

(73) Assignee: LexisNexis

( * ) Notice: Subject to any disclaimer, the term of this patent is extended or adjusted under 35 U.S.C. 154(b) by 0 days.

(21) Appl. No.: 13/443,589

(22) Filed: Apr. 10, 2012

(65) Prior Publication Data

US 2012/0197879 A1    Aug. 2, 2012

Related U.S. Application Data

(63) Continuation of application No. 12/506,092, filed on Jul. 20, 2009, now Pat. No. 8,176,044.

(51) Int. Cl.
*G06F 17/30* (2006.01)

(52) U.S. Cl.
USPC ............ 707/723; 707/706; 707/707; 707/729

(58) Field of Classification Search
USPC .................................. 707/723, 706, 707, 729
See application file for complete search history.

(56) References Cited

U.S. PATENT DOCUMENTS

| | | | |
|---|---|---|---|
| 7,769,746 B2 | 8/2010 | Lu et al. | |
| 7,974,974 B2 | 7/2011 | Tankovich et al. | |
| 2002/0099700 A1* | 7/2002 | Li ..................... | 707/5 |
| 2005/0216434 A1* | 9/2005 | Haveliwala et al. ............ | 707/1 |
| 2005/0262050 A1* | 11/2005 | Fagin et al. ........................ | 707/3 |
| 2007/0288438 A1 | 12/2007 | Epstein | |
| 2008/0027913 A1 | 1/2008 | Chang et al. | |
| 2008/0114750 A1* | 5/2008 | Saxena et al. ..................... | 707/5 |
| 2009/0006438 A1 | 1/2009 | Tunkelang et al. | |
| 2009/0024700 A1* | 1/2009 | Garg et al. ..................... | 709/203 |
| 2009/0313236 A1* | 12/2009 | Hernacki et al. ................. | 707/5 |
| 2010/0114878 A1* | 5/2010 | Lu et al. ........................ | 707/723 |

OTHER PUBLICATIONS

International Search Report and Written Opinion of International Searching Authority for corresponding PCT Application No. PCT/US/10/42089, mailed Sep. 1, 2010 (10 pages).
Tao et al. "An Exploration of Proximity Measures in Information Retrieval", Copyright 2007 ACM.
International Preliminary Report on Patentability issued in corresponding PCT Application No. PCT/US2010/042069, mailed Feb. 2, 2012, 8 pages.

* cited by examiner

*Primary Examiner* — Etienne Leroux
*Assistant Examiner* — Cindy Nguyen
(74) *Attorney, Agent, or Firm* — Dinsmore & Shohl LLP

(57) ABSTRACT

A method and apparatus are provided for ranking documents according to relevancy scoring. In one implementation, a computer-implemented method is provided for receiving, from a database over a network, a document resulting from a search on a database, the document containing terms that match the search criteria. The method may calculate a standard deviation of a probability distribution function representing a distribution of the terms in the document that match the search criteria. The method may further determine relative distances between the terms in the document that match the search criteria according to the standard deviation. The method may further calculate a proximity boost value using the relative distances, and apply the proximity boost value to a base relevancy score of the document to determine a relevancy ranking. The document may then be ranked according to the relevancy ranking.

24 Claims, 4 Drawing Sheets

FUZZY PROXIMITY BOOSTING AND INFLUENCE KERNELS

CROSS-REFERENCE TO RELATED APPLICATION

This application is a continuation of U.S. patent application Ser. No. 12/506,092, filed Jul. 20, 2009 (currently pending), which is incorporated herein by reference.

BACKGROUND

I. Technical Field

The present disclosure generally relates to the field of search assistance technologies, such as query-recommendation systems. More particularly, the disclosure relates to computerized systems and methods for applying a proximity-ranking function to documents in order to provide relevant search results based on a query.

II. Background Information

The advent of the Internet has resulted in collections of networked computer systems through which users can access vast amounts of information. The information accessible through the Internet is stored in electronic files (e.g., documents) that are accessible through the computer systems. With advancements of storage capacity technology, the amount of information stored on each computer system has dramatically increased. Due to this increasing volume of information as well as the sheer number of documents being stored on computer systems, it is becoming more difficult than ever to locate information that is relevant to a particular subject.

To assist users in locating documents that are relevant to a particular subject, the user may conduct a search using an information retrieval system that is typically referred to as a search engine. Search engines attempt to locate and index as many of the documents provided by as many computer systems of the Internet as possible. In the past, search engines would typically perform a Boolean search based on terms entered by a user, and results from the search engine would be ranked by the number of search query terms matched in a document. An occurrence of a particular search query term in a particular document is considered a "hit," and the number of hits contribute to the document's similarity score for determining relevance of the document. The resulting documents would then be ranked and presented to a user in descending order according to relevancy.

In the above process, the scoring of the documents would not take into account proximity, or "density," of the hits in the actual document. If hits are located close to one another in a document, this may indicate that the document is more relevant than a document in which hits are not located near each other. However, a typical search engine would not benefit from this additional analysis because a document containing the most hits overall would be ranked highest, as the rank (R) for a particular document would simply be a function of frequency of hits in a document:

$$R = f(\text{hits}) \tag{1}$$

Thus, the search engine would not differentiate between situations where hits are located farther apart from one another in the document from situations where the hits are closer to one another.

More modern search engines permit users to perform a search and to explicitly request phrase searching (e.g., a user submits words surrounded by quotes). Upon requesting phrase searching, search engines may then take into account the positional information of hits found in the documents, and rank the documents accordingly. However, requiring a user to indicate a preference for phrase searching is undesirable. Furthermore, the precision of the proximity-ranking functions of most search engines is not sufficiently accurate to fully assist a user in determining the most relevant documents for a search. That is, most hit-density estimators used in existing search engines do not use complete information about all hits in the document and can therefore lead to biased ranking functions, and improperly ranked documents.

Accordingly, proximity-ranking search engines suffer from drawbacks that limit their efficiency and usefulness. Therefore, there is a need to develop improved search systems and methods that overcome the above drawbacks.

SUMMARY

In one disclosed embodiment, a computer-implemented ranking method is provided. The method may include performing a search on a database according to search criteria. The method may also include receiving, from the database over a network, a document resulting from the search, the document containing terms matching the search criteria. The method may further include calculating the standard deviation of a probability distribution function representing distribution of terms in the document matching the search criteria. The method may further include determining relative distances between the terms in the document matching the search criteria according to the standard deviation. The method may further include calculating a proximity boost value using the relative distances. The method may further include applying the proximity boost value to a base relevancy score of the document to determine a relevancy ranking for the document, and ranking the document according to the relevancy ranking.

In another disclosed embodiment, a computer-readable medium that stores program instructions implements the above-described method.

In yet another disclosed embodiment, an apparatus determines relevant search results. The apparatus may include a memory device storing instructions for determining relevant search results, and a processor executing the instructions. The instructions, when executed by the processor of the apparatus, may instruct the apparatus to perform a series of steps. The steps may include performing a search on a database according to search criteria. The steps may also include receiving, from the database over a network, a document resulting from the search, the document containing terms that match the search criteria. The steps may further include calculating a standard deviation of a probability distribution function representing a distribution of terms in the document that match the search criteria. The steps may further include determining relative distances between the terms in the document that match the search criteria according to the standard deviation. The steps may further include calculating a proximity boost value using the relative distances. The steps may further include applying the proximity boost value to a base relevancy score of the document to determine a relevancy ranking for the document, and ranking the document according to the relevancy ranking.

In yet another disclosed embodiment, a computer-implemented ranking method is provided. The method may include sending, to a remote computer system via a network, a search query containing query terms. The method may also include obtaining, at the remote computer system, documents resulting from performing the search query on a document database, the documents containing terms that match the search query. The method may further include determining base relevancy scores for the documents. The method may further include adjusting the base relevancy scores by measuring relative distances between the terms that match the search query in the documents using a probability distribution function. The method may further include ranking the documents according to the adjusted base relevancy scores.

It is to be understood that both the foregoing general description and the following detailed description are exemplary and explanatory only and are not restrictive of embodiments, as claimed.

BRIEF DESCRIPTION OF THE DRAWINGS

The accompanying drawings, which are incorporated in and constitute a part of this disclosure, illustrate various embodiments. In the drawings.

DETAILED DESCRIPTION

Figure 1:
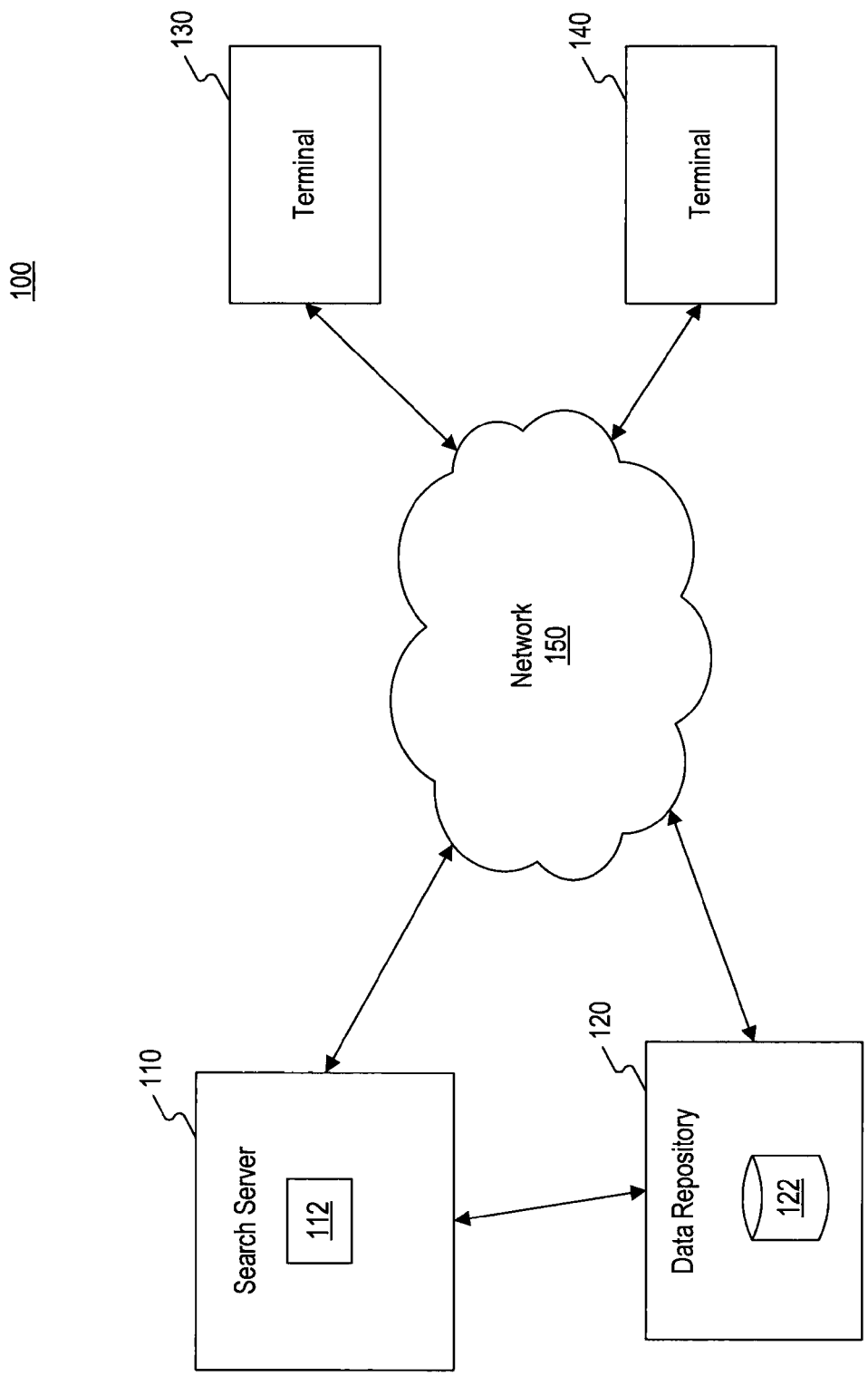
FIG. 1 is a diagram of an exemplary system for implementing a search tool.

The following detailed description refers to the accompanying drawings. Wherever possible, the same reference numbers are used in the drawings and the following description to refer to the same or similar parts. While several exemplary embodiments are described herein, modifications, adaptations and other implementations are possible. For example, substitutions, additions or modifications may be made to the components illustrated in the drawings, and the exemplary methods described herein may be modified by substituting, reordering, or adding steps to the disclosed methods. Accordingly, the following detailed description is not limiting. Instead, the proper scope is defined by the appended claims.

FIG. 1 shows an example of a system 100 that may search an index of documents stored in a data repository, consistent with a disclosed embodiment. As shown in system 100, search server 110, data repository 120, and terminals 130 and 140 are in communication with a network 150. Although a specific numbers of servers and two terminals are depicted in FIG. 1, any number of these devices may be provided. Furthermore, the functions provided by one or more devices of system 100 may be combined. In particular, the functionality of any one or more devices of system 100 may be implemented by any appropriate computing environment.

Network 150 provides communications between the various devices in system 100, such as search server 110, data repository server 120, and terminals 130 and 140. In addition, search server 110 may access legacy systems (not shown) via network 150, or may directly access legacy systems, databases, or other network applications. Network 150 may be a shared, public, or private network, may encompass a wide area or local area, and may be implemented through any suitable combination of wired and/or wireless communication networks. Furthermore, network 150 may comprise a local area network (LAN), a wide area network (WAN), an intranet, or the Internet. Network communications may be implemented using an HTTPS (hypertext transfer protocol secure) environment, such that data transfers over the network may be done in a secure fashion.

Search server 110 may comprise a computer (e.g., a personal computer, network computer, server, or mainframe computer) having one or more processors (not shown) that may be selectively activated or reconfigured by a computer program. Furthermore, search server 110 may distribute data for parallel processing by one or more additional servers (not shown). Search server 110 may also be implemented in a distributed network. Alternatively, search server 110 may be specially constructed for carrying-out methods consistent with disclosed embodiments.

Search server 110 may include a memory 112 for storing program modules that, when executed by a processor (not shown) of the search server 110, execute one or more processes that search document indices and determine relevancy rankings for documents. Memory 112 may be one or more memory devices that store data and may also comprise, for example, one or more of RAM, ROM, magnetic storage, or optical storage.

Data repository 120 may include a database 122 that stores data records or documents for entities such as a people, businesses, buildings, websites, vehicles, etc. Although certain entities are specified herein, one of ordinary skill in the art will appreciate that embodiments may apply to any kind of entity. Furthermore, although one database is shown in FIG. 1, data repository may include more than one database. The databases included in data repository 120 may constitute a knowledge base. Furthermore, data repository 120 may receive data from search server 110, terminals 130-140, and/or other servers (not shown) available via network 150. Although shown as separate entities in FIG. 1, search server 110 and data repository server 120 may be combined. For example, search server 110 may include one or more databases in addition to or instead of data repository 120. Furthermore, search server 110 and data repository 120 may exchange data directly or via network 150.

Terminals 130-140 may be any type of device for communicating with search server 110 and/or data repository 120 over network 150. For example, terminals 130-140 may be personal computers, handheld devices, or any other appropriate computing platform or device capable of exchanging data with network 150. Terminals 130-140 may each include a processor (not shown) and a memory (not shown). Furthermore, terminals 130-140 may execute program modules that provide one or more graphical user interfaces (GUIs) on one or more types of input/output devices (not shown), such as a display monitor, keyboard, or mouse, for interacting with network resources and/or accessing search server 110. For example, one of terminals 130-140 may transmit a search query or data set (e.g., a webpage, a newspaper article, a book, etc.) to search server 110.

Figure 2:
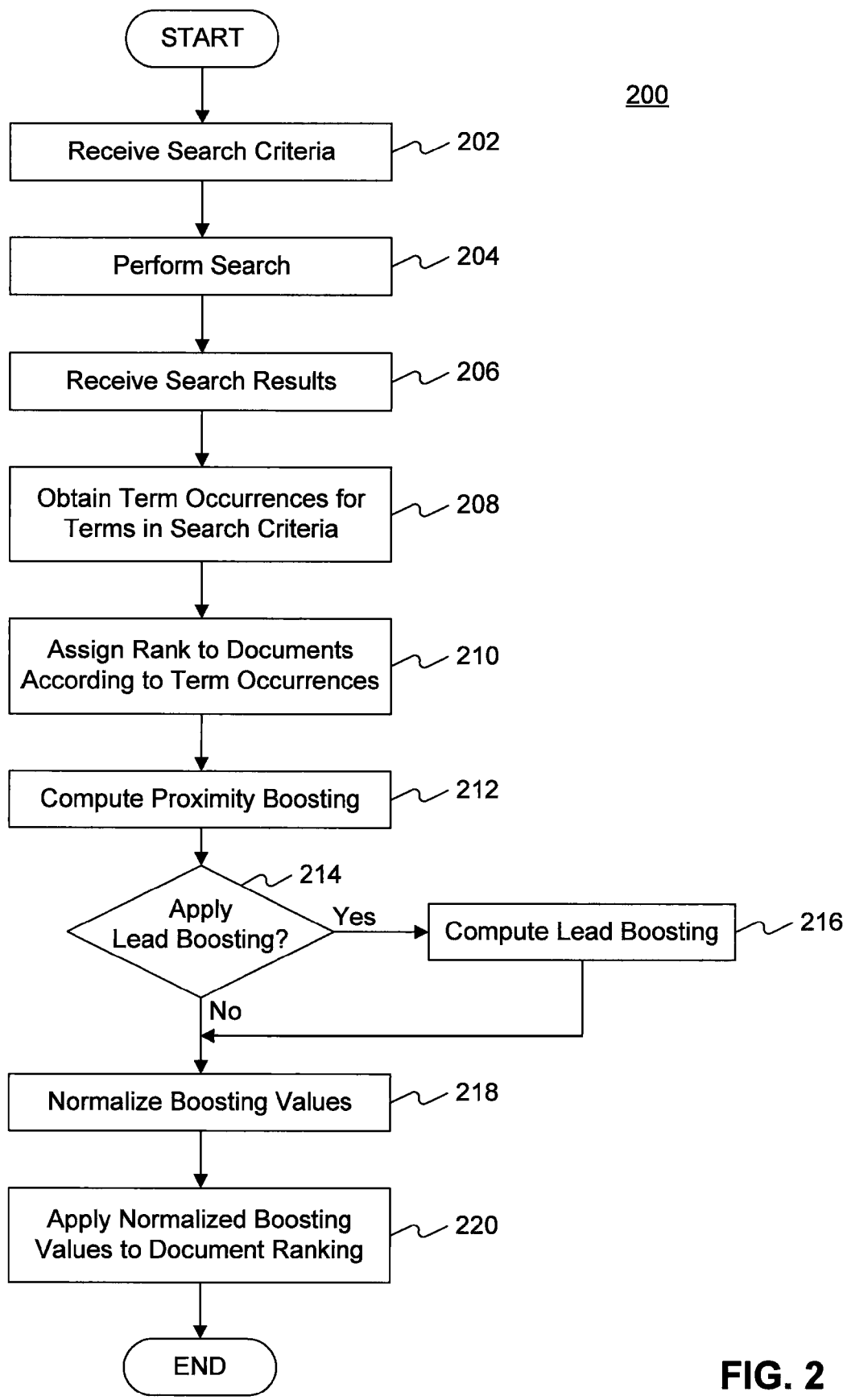
FIG. 2 is a flow diagram of an exemplary method for determining a ranking of search results based on relevancy boosting values.

FIG. 2 is a flow diagram 200 of an exemplary method for determining and presenting relevant documents according to boosting of relevancy values, consistent with a disclosed embodiment. The method described in connection with FIG. 2 may be implemented by, for example, program modules stored in memory 112 of search server 110.

At the start of the process, in step 202, search server 110 may receive an input search criteria in the form of a search query. Search server 110 may receive the input search criteria from a user input provided to a GUI of terminal 130 or 140. The input search criteria may include any number of words or phrases intended to express a desired search concept. Search server 110 may receive the input search criteria via network 150. Alternatively, search server 110 may receive the input search criteria from a local storage medium. For example, the input search criteria may have been read from a document (e.g., a webpage), for example, at one of terminals 130 or 140, or from a document stored in memory 112 of search server 110.

Search server 110 may, based on a user selection or predetermined criteria, restrict the search of database 122 to particular documents. Restrictions to the search of database 122 may include, for example, limiting documents to a particular type of document (e.g., PDF, HTML, XML, etc.), author, size, date range, usage right, or originating region of the document. Furthermore, the user may specify a threshold number of results that should be returned from the search of database 122. The threshold may be set automatically or manually for a particular query, and may be set by a user of terminal 130 or 140, or an administrator of search server 110 or data repository 120. For example, a user at one of terminals 130 or 140 may increase or decrease the number of documents that search server 110 may return for the input search criteria.

Next, in step 204, search server 110 may determine a result set of documents that is responsive to the input search criteria by performing a query of database 122 and extracting a set of results matching the input search criteria. Database 122 may be a collection of documents that have been indexed into an inverted index (i.e. an index data structure storing a mapping of content in a document, such as words or numbers, to positions of each word or number within a document). When indexing the documents, terms of the documents may be tokenized, and assigned token positions within the document. Furthermore, the terms may serve as primary keys of database 122. As a result of the indexing, database 122 may provide a mapping of what documents contain a particular term that matches the input search criteria. Furthermore, database 122 may record document-lengths, or the total number of terms found in a particular document, for each document in the collection of documents. These document-lengths may be stored as a separate index of database 122, or stored in association with each respective document.

In step 206, search server 110 may receive the documents extracted from database 122 as a result of the search performed in step 204. The documents may be received as a single result set containing the documents, a listing of document file names or identifiers, or as citations to the documents located in database 122 of data repository 120 by way of links embedded in an HTML, XML, or other such document.

In step 208, search server 110 may obtain, from the documents extracted from database 122, the number of occurrences of each term from the input search criteria. This may be performed using token positions assigned to terms during the indexing of documents in database 122. For example, assume a user searched for the term "dog." Search server 110 may determine that "dog" appears two times in document D1, two times in document D2, and three times in document D3. In step 210, using the information provided in step 208, a ranking score may be determined according to the number of hits found in the documents, and the documents may be ranked according to the ranking score. In this example, document D3 would have the highest ranking, due to having the highest frequency of the term "dog."

However, such a search strategy does not consider the density, or adjacency, of the hits in the documents. Most documents, if not all, exhibit modest topic-drift. A portion of the document may likely be more relevant than the whole document. The more relevant portion of a document, therefore, may correspond to the location where hits corresponding to the terms of an input search criteria occur in close proximity to one another. While D3 may contain the most number of hits of "dog," the hits may be separated by a large amount of additional text, which may render document D3 less desirable to a user performing the search.

To provide more relevant search results, one may apply boosting to the ranking score determined in step 210. By boosting a document's relevance score based on an affinity of the hits, as determined by proximity or adjacency of hits, the precision of search results can be improved. For example, a scoring function that considers hit-density and may provide boosting to traditional search scoring may be defined as:

$$R = f(\text{hits}, \text{density}(\text{hits})) \qquad (2)$$

By ascertaining the density of the hits in the document, one may use this information to more accurately determine whether a document is relevant for a particular search topic. However, to use a measure of hit-density, a base measure is established of a distance between hits in a document. Once this distance is determined, the density may be estimated as a ratio of the number of hits to the distance between the hits.

Figure 3:
FIG. 3 is a diagram of a distribution of search term hits in an exemplary document.

For example, as shown in FIG. 3, consider a document D1 having search hits at positions P1, P2, P3, P4, and P5 of search terms T1, T3, T2, T1, and T2, respectively. To take into account the hit-density of document D1, a unit of distance must be established as a baseline measure for the document. With more than two hits in the document, the computation of inter-hit distance d becomes more complicated because separation is calculated between only two points in a document. With more than two hits in the document, deciding which two hits to choose for measuring the baseline unit of distance can have adverse effects on efficiency, as some methods may be more computationally expensive than alternative methods.

Figure 4:
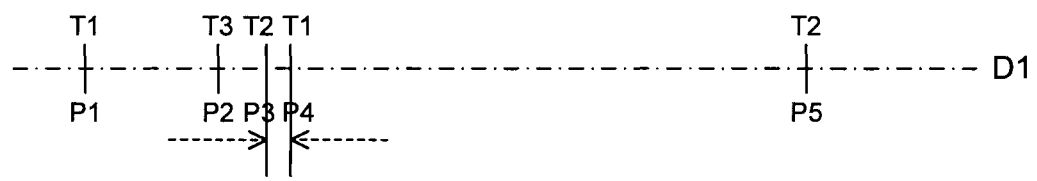
FIG. 4 is a diagram representing a first method for determining inter-hit distances in an exemplary document.

A number of different methods for determining the baseline unit of distance may be used. A first method for selecting a baseline unit of distance, exemplified in FIG. 4, is called a best-case estimate. The method may use a simple heuristic to measure the two most adjacent edges of hits in a document. As shown in FIG. 4, the minimum separation between hits P3 and P4 may be used, whereby the inter-hit distance d would be defined as d=P4−P3.

Figure 5:
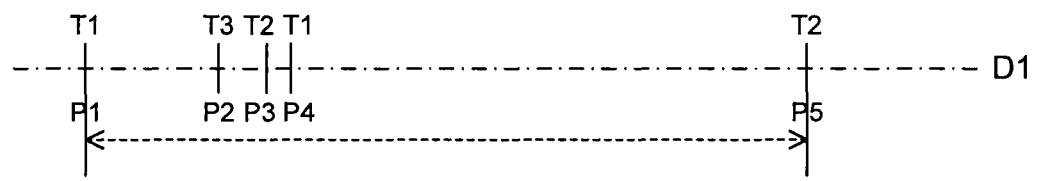
FIG. 5 is a diagram representing a second method for determining inter-hit distances in an exemplary document.

A second method is exemplified in FIG. 5, called a worse-case estimate. The method may use a simple heuristic to measure the two most extreme edges of hits in a document. As shown in FIG. 5, the maximum separation between hits P1 and P5 may be used, whereby the inter-hit distance d would be defined as d=P5−P1.

A third method, called an average estimate, for selecting a baseline unit of distance, may be used. The method may compute the mean of the best-case and worst-case estimates. That is, the inter-hit distance d would be defined as $$d = \frac{((P4 - P3) + (P5 - P1))}{2}.$$

Figure 6:
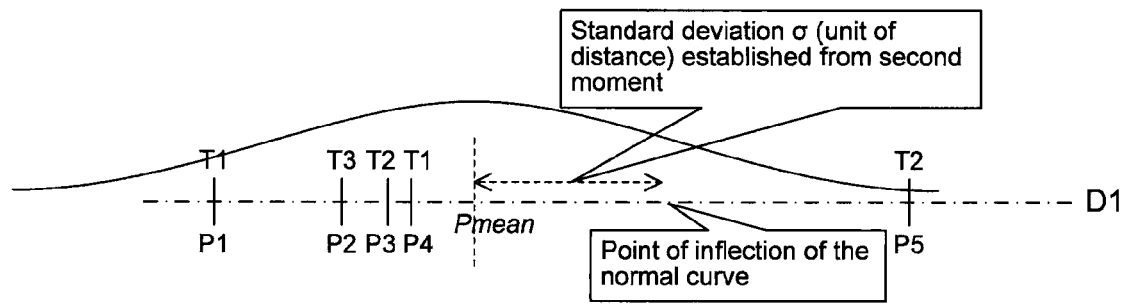
FIG. 6 is a diagram representing a fourth method for determining inter-hit distances in an exemplary document using a probability distribution curve.

While these three methods may each provide an acceptable estimate of inter-hit distance in a document, there is a fourth method, called a maximum likelihood estimate, that takes into account information concerning every hit in the document, and therefore is capable of yielding greater precision when determining the inter-hit distance and ultimately relevancy of the document. As shown in FIG. 6, the standard deviation of a probability distribution function of hits in the document may be used as a baseline for estimating inter-hit distances in documents. By using a distribution function, if a number of hits in a document are concentrated in a particular region of the document, the likelihood of a particular hit's relevancy may be highest at the center of the region and would taper off as hits get farther away from the center of the probability distribution.

The probability distribution function for hits in a document may be represented as a normal distribution with a center in the middle of the region of interest, as shown in FIG. 6. However, since the region of interest is not known to a user a priori to subjective assessment of a document, an unbiased estimate for the region of interest can be computed as a mean of the hit-positions of the document, i.e., a hit center, calculated as:

$$P_{mean} = \sum \frac{p}{n} \quad (3)$$

where p represents positions of the hits in the document, and n represents the total number of hits in the document. Upon calculating the mean position of the hits, this can be used to assist in determining inter-hit distances.

Specifically, upon determining the mean position of the hits of the document, one may calculate the standard deviation of hits in the document. If all of the hits in a document are densely concentrated in a particular region of interest, the probability distribution function may show a small standard deviation, and high kurtosis (i.e., a high measure of "peakedness" of the distribution, where higher kurtosis means more of the variance of the distribution is due to infrequent extreme deviations from the mean). The standard deviation calculated from the hits in the document may thus be used as a natural estimate for measuring inter-hit distances in a document, i.e., the distance of the hit with respect to the mean can be expressed in units of standard deviation, as shown in FIG. 6. For example, if it is determined from the distribution of hits in the document that the standard deviation is σ, then deviation of hit i in the document may be calculated as:

$$D_i = \frac{(P_i - P_{mean})}{\sigma} \quad (4)$$

Figure 7:
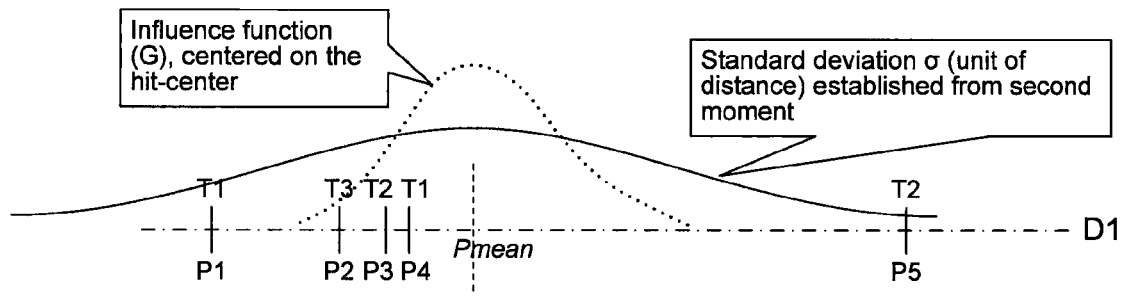
FIG. 7 is a diagram of an exemplary influence function applied to determine boosting values based on inter-hit distances in an exemplary document.

Returning to FIG. 2, upon determining the standard deviation of hits in a document, a baseline unit of measuring distance between terms may be determined using the standard deviation. Using this baseline unit of measure, search server 110 may apply boosting to search results in step 212 of FIG. 2. Boosting may be performed by either applying an influence function to the baseline scoring routines provided by the original Boolean or natural language search implementation to arrive at a computed boosting value, or by using the boost values directly for ranking according to the boost values. As shown in FIG. 7, an influence function G may be applied to provide a boosting to hits found in proximity to the mean position, i.e., P2, P3, and P3, and thus provide a boosting to the baseline scoring of the particular document. The function applied to the baseline scoring may be, for example, a discontinuous, non-differential function, a heuristic function, a uniform function, a step-function, or any function that may even disregard the deviation distance. Using an influence function, proximity of hits in the document may be accounted for in relevancy scoring.

Figure 8:
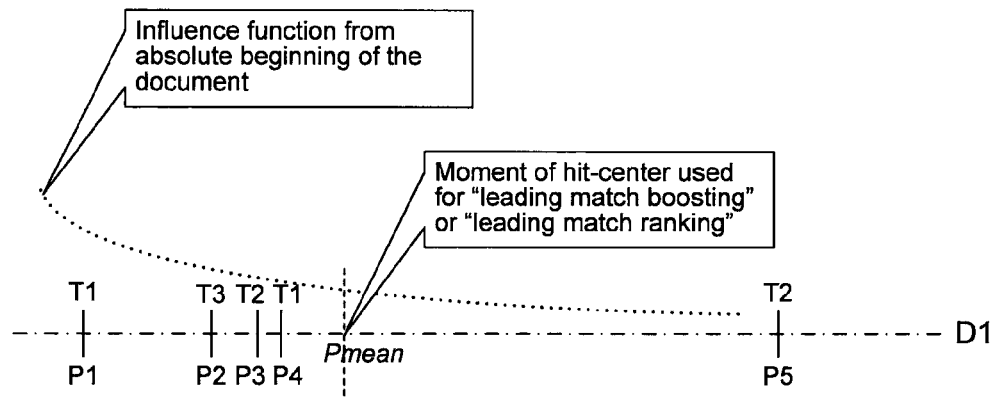
FIG. 8 is a diagram of an exemplary influence function for an ideal hit-zone at the absolute beginning of an exemplary document.

In step 214, search server 110 may determine whether to apply lead boosting to the relevancy scoring for a document. Search server 110 may be directed to apply lead boosting in response to a user selection, or based on predetermined criteria. Lead boosting may be applied in situations where a document may provide an overview of a topic at the top of the document and then proceed into a more complete disclosure of the topic and/or additional topics in the body of the document. Search server 110 may determine that a topic of interest occurs at the beginning of the document, rather than at the end. In such situations, the mean of the hit positions may be used as an unbiased estimate for the document's hit-center, and a scoring mechanism may provide greater influence to documents having hits at the top of the document (i.e., the hit-center is close to a zero position) over hits at the bottom of the document (i.e., the hit-center is close to the length of the document measured according to the total number of words). If search server 110 determined to apply lead boosting, then in step 216, a lead boosting value is computed. FIG. 8 provides an example of an influence function being modified to provide extra boosting for hits founds in, for example, the beginning of the document.

Lead boosting may be applied to any section of a document to provide an "anchor" area where boosting should be performed. If a document is assembled from multiple section, each section being of a different function to the document, a user may desire to "anchor" boosting to a single particular section of the document, determined in advance based on the structure of the document. For example, consider a web page that has advertisements at top, left, bottom, and right edges, and content located in the middle of the document. In this example, an "anchor" may be applied to a word-position in the document corresponding to where the content may be located. Alternatively, an exemplary news story may contain too much metadata information at the top, while the actual content starts on page 3 of the news story. Assuming the page contains, for example, approximately 150 preface words, an "anchor" may be applied at, for example, the position of word 300 in the news story. If an idea location of relevance in a document is a priori known, or even learned from past data involving similar documents, an "anchor" for computing lead boosting may be fixed at a particular section of a document, such as the middle of the document instead of at the absolute beginning of the document, thereby providing lead boosting for information found in pertinent content sections of a document.

In step 218, search server 110 may perform normalization on the boosting values. Normalization is performed to bring the scale of the proximity boosting value in line with the scale of the lead boosting value, and determine a final normalized boosting value. Normalization may be performed by applying a mathematical operation to the proximity boosting value and the lead boosting value. An exemplary normalization method may include calculating a normalized boost value by multiplying a document's lead boosting value by the square root of the document's proximity boosting value.

In 220, search server 110 may apply the normalized boost value to the baseline scoring of the document to adjust the final document relevancy ranking. The ranked results may be transmitted over network 150 to terminals 130-140, and the ranked results may be displayed and presented to a user on a GUI of terminals 130-140. Alternatively, search server 110 may store the ranked results into a document (e.g., a webpage) for transmitting and storing, or displaying, on user terminals 130-140.

While the above implementation assumes the computation of one proximity boosting value for a document based on a single topic of interest, a user may have an interest in more than one topic for a particular document. In this case, different calculations for standard deviation and influence estimation functions can be used for each unique topic, and search server 110 may combine proximity boosting values according to each unique topic to calculate a cumulative relevancy ranking for the combination of the unique topics.

For example, consider a search query containing multiple topics of interest. While the above implementation concerning a single topic of interest utilizes a single probability distribution, a search query containing multiple topics of interest may be represented using multiple probability distributions, where each probability distribution corresponds to one of the topics of interest. By determining separate probability distribution functions for each topic of interest, a level of consistency (or lack of consistency) of peaks, or the standard deviation of the peaks, of the individual probability distribution functions may be used as an estimate for determining the relevancy of a document. That is, a document presumably relevant to a two-term query should presumably discuss the two terms in equal detail, i.e., the terms should exhibit probability distributions that are similar in nature.

Upon determining the separate probability distribution functions for each topic of interest, based on the level of consistency of the peaks, search server 110 may calculate a hit-consistency boosting value to be used solely, or in combination, with the proximity and lead boosting values in determining the relevancy of a particular document. Alternatively, the level of consistency of the peaks may be compared to a threshold value, and only documents having a level of consistency of the peaks surpassing the threshold value may receive a hit-consistency boosting.

For example, consider a search query "dog cat." A search engine that returns documents mentioning "dog" and "cat" in close relation with one another would be preferable over a search engine that returns documents mentioning each of the terms, but where the terms are not in close relation to one another, such as "dog fight" and "cat fight." Similarly, it is also preferable to have a search engine that returns documents mentioning "dog" and "cat" in similar frequencies, rather than documents that frequently recite "dog," and recite "cat" only in passing reference.

Therefore, by calculating probability distribution functions for each term in the search query, the peaks of the probability distribution functions will be indicative of the frequency of the use of that term in a particular document. That is, a document with a first probability distribution function having a high degree of kurtosis (i.e., a sharp peak to the distribution) for the word "dog" near the center of the document, and a second probability distribution function having a high degree of kurtosis for the word "cat" near the center of the document, is likely to be a relevant document to the search query, and a hit-consistency boosting value may be applied to this particular document. In contrast, a document having a high degree of kurtosis for the word "dog" near the center of the document, and a second probability distribution function having a high degree of variance (i.e., a shallow peak representing the distribution) for the word "cat" is unlikely to be a relevant document for the particular search query.

Alternatively, the above discussed implementation may be used to consolidate ranking of search results from federating search engines, i.e., performing boosting on results provided by two different search services. Two different search services may respond to the same input search criteria with different result sets, each result set containing different documents. Sending a single input search criteria to multiple search services in this fashion is known as a "federated search." For example, the query "tax and earned income" may return statutes from one search service, and court cases from another service. Because the distributions of the input search criteria terms and their responsive documents may be differently skewed from corpus and service to corpus and service, the most relevant document from the corpus of one service might be only weakly relevant in comparison with documents of returned from the more-relevant corpus of another service. Since search services rarely return the details of the distributions of query terms and returned documents in their underlying corpora, there is no well-principled basis for inter-ranking (or "combining" or "interleaving") the results of multiple services on a single page.

However, many search services now routinely return "snippets" of text for display alongside the titles of returned documents. Such snippets are sections of text from each document, normally selected for having a high density of query terms. Where such snippets are available from two or more search services, one embodiment allows the separate result sets to be inter-ranked on a principled basis. In this embodiment, a proximity metric may be calculated for the query terms found within the text of each returned document title and its associated snippet.

The proximity metric may be derived from the estimated mean and estimated average positions of the hits based on the standard deviation of hits, the process of which is outlined above. A single "federated result set" may be returned, consisting of links to all documents returned from all services ordered by this proximity metric. For example, search server 110 may select the highest-scoring n documents from the top t documents of each of the top r result sets. The process may then be reapplied recursively with the n selected documents removed until there are no more documents to select, display, and remove.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include software, but systems and methods consistent with the present invention may be implemented as a combination of hardware and software or in hardware alone. Examples of hardware include computing or processing systems, including personal computers, servers, laptops, mainframes, microprocessors and the like. Additionally, embodiments may use different types of computer-readable storage mediums, such as secondary storage devices, for example, hard disks, floppy disks, or CD-ROM, or other forms of RAM or ROM.

Computer programs based on the written description and methods of this specification are within the skill of a software developer. The various programs or program modules may be created using a variety of programming techniques. For example, program sections or program modules may be designed in or by means of Java, C++, assembly language, or any formal language that supports sorting and indexed arrays. One or more of such software sections or modules may be integrated into a computer system or existing e-mail, database, or browser software.

Moreover, while illustrative embodiments have been described herein, the scope includes any and all embodiments having equivalent elements, modifications, omissions, combinations (e.g., of aspects across various embodiments), adaptations and/or alterations based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps. It is intended, therefore, that the specification and examples be considered as exemplary only, with a true scope and spirit being indicated by the following claims and their full scope of equivalents.

What is claimed is:

1. A computer-implemented ranking method comprising:
sending, to a remote computer system via a network, a search query containing query terms;
obtaining, at the remote computer system, documents resulting from performing the search query on a document database, the documents containing terms that match the search query;
determining base relevancy scores for the documents;
adjusting the base relevancy scores by applying a lead boosting value calculated according to an influence function, the influence function promoting a particular word position in a document, the particular word position being a predetermined number of words from the beginning of the document; and
ranking the documents according to the adjusted base relevancy scores.

2. The method of claim 1, further comprising:
adjusting the base relevancy scores based on measuring relative distances between the terms that match the search query in the documents according to a probability distribution function.

3. The method of claim 1, further comprising:
calculating a plurality of probability distribution functions for the search query, wherein one of the plurality of probability distribution functions corresponds to one of the query terms in the search query;
determining, based on the plurality of probability distribution functions, a level of consistency between the plurality of probability distribution functions;
calculating hit-consistency boosting values based on the level of consistency between the plurality of probability distribution functions; and
applying the hit-consistency boost values to the base relevancy scores of the documents.

4. The method of claim 1, wherein the influence function is selected from one of a discontinuous, non-differential function, a heuristic function, a uniform function, a step-function, or a function that disregards deviation distance.

5. The method of claim 1, wherein the lead boosting value is applied to the base relevancy scores in response to a user selection, or based on satisfaction of a predetermined criteria.

6. The method of claim 1, wherein the lead boosting value is applied to the base relevancy scores upon determining that at least one document contains a plurality of sections.

7. The method of claim 6, wherein the influence function is used to promote one of the plurality of sections of the document.

8. The method of claim 1, further comprising:
determining types for the plurality of documents; and
applying different influence functions to the documents according to the determined types of the documents.

9. A tangibly embodied non-transitory computer-readable storage medium storing instructions, that, when executed by a processor, perform a ranking method comprising:
sending, to a remote computer system via a network, a search query containing query terms;
obtaining, at the remote computer system, documents resulting from performing the search query on a document database, the documents containing such terms that match the search query;
determining base relevancy scores for the documents;
adjusting the base relevancy scores by applying a lead boosting value calculated according to an influence function, the influence function promoting a particular word position in a document, the particular word position being a predetermined number of words from the beginning of the document; and
ranking the documents according to the adjusted base relevancy scores.

10. The tangibly embodied non-transitory computer-readable storage medium of claim 9, the method further comprising:
adjusting the base relevancy scores based on measuring relative distances between the terms that match the search query in the documents according to a probability distribution function.

11. The tangibly embodied non-transitory computer-readable storage medium of claim 9, the method further comprising:
calculating a plurality of probability distribution functions for the search query, wherein one of the plurality of probability distribution functions corresponds to one of the query terms in the search query;
determining, based on the plurality of probability distribution functions, a level of consistency between the plurality of probability distribution functions;
calculating hit-consistency boosting values based on the level of consistency between the plurality of probability distribution functions; and
applying the hit-consistency boost values to the base relevancy scores of the documents.

12. The tangibly embodied non-transitory computer-readable storage medium of claim 9, wherein the influence function is selected from one of a discontinuous, non-differential function, a heuristic function, a uniform function, a step-function, or a function that disregards deviation distance.

13. The computer-readable storage medium of claim 9, wherein the lead boosting value is applied to the base relevancy scores in response to a user selection, or based on satisfaction of a predetermined criteria.

14. The tangibly embodied non-transitory computer-readable storage medium of claim 9, wherein the lead boosting value is applied to the base relevancy scores upon determining that at least one document contains a plurality of sections.

15. The tangibly embodied non-transitory computer-readable storage medium of claim 14, wherein the influence function is used to promote one of the plurality of sections of the document.

16. The tangibly embodied non-transitory computer-readable storage medium of claim 9, the method further comprising:
determining types for the plurality of documents; and
applying difference influence functions to the documents according to the determined types of the documents.

17. An apparatus comprising:
a memory device storing instructions for determining relevant search results; and a processor executing the instructions to perform the steps of:

performing a search on a document database according to a search query containing query terms;

obtaining, from the document database over a network, documents resulting from performing the search query, the documents containing terms that match the search query;

determining base relevancy scores for the documents;

adjusting the base relevancy scores by applying a lead boosting value calculated according to an influence function, the influence function promoting a particular word position in a document, the particular word position being a predetermined number of words from the beginning of the document; and ranking the documents according to the adjusted base relevancy scores.

18. The apparatus of claim 17, the processor executing the instructions to perform the further step of:

adjusting the base relevancy scores based on measuring relative distances between the terms that match the search query in the documents according to a probability distribution function.

19. The apparatus of claim 17, the processor executing the instructions to perform the further steps of:

calculating a plurality of probability distribution functions for the search query, wherein one of the plurality of probability distribution functions corresponds to one of the query terms in the search query;

determining, based on the plurality of probability distribution functions, a level of consistency between the plurality of probability distribution functions;

calculating a hit-consistency boosting values based on the level of consistency between the plurality of probability distribution functions; and applying the hit-consistency boost values to the base relevancy scores of the documents.

20. The apparatus of claim 17, wherein the influence function is selected from one of a discontinuous, non-differential function, a heuristic function, a uniform function, a step-function, or a function that disregards deviation distance.

21. The apparatus of claim 17, wherein the lead boosting value is applied to the base relevancy scores in response to a user selection, or based on satisfaction of a predetermined criteria.

22. The apparatus of claim 17, wherein the lead boosting value is applied to the base relevancy scores upon a determining that at least one document contains a plurality of sections.

23. The apparatus of claim 22, wherein the influence function is used to promote one of the plurality of sections of the document.

24. The apparatus of claim 17, the processor executing the instructions to perform the further steps of:

determining types for the plurality of documents; and applying different influence functions to the documents according to the determined types of the documents.

\* \* \* \* \*